United States Patent [19]

Stange et al.

[11] 4,059,260

[45] Nov. 22, 1977

[54] DOCUMENT HANDLING APPARATUS

[75] Inventors: Klaus K. Stange, Pittsford; Richard E. Smith, Webster; Thomas J. Hamlin, Macedon; James R. Cassano, Penfield, all of N.Y.

[73] Assignee: Xerox Corporation, Stamford, Conn.

[21] Appl. No.: 638,590

[22] Filed: Dec. 8, 1975

[51] Int. Cl.² .......................................... B65H 5/22
[52] U.S. Cl. ........................................ 271/3; 271/9;
        271/173; 271/195; 271/239; 271/244; 271/245
[58] Field of Search ................... 271/3, 5, 9, 173, 195,
                                        271/244, 239, 245

[56] References Cited

U.S. PATENT DOCUMENTS

| | | | |
|---|---|---|---|
| 3,293,414 | 12/1966 | Barcia | 302/2 R |
| 3,405,977 | 10/1968 | Albright | 271/195 X |
| 3,406,382 | 10/1968 | Wilmer | 271/9 X |
| 3,504,910 | 4/1970 | Spyropoulos | 271/5 X |
| 3,519,801 | 7/1970 | Nielsen | 271/9 X |
| 3,633,902 | 1/1972 | Worden | 271/195 UX |
| 3,659,837 | 5/1972 | Umahashi | 271/9 |
| 3,705,413 | 12/1972 | Cronquist | 271/195 X |

*Primary Examiner*—Richard A. Schacher
*Attorney, Agent, or Firm*—Carlos Nieves; James J. Ralabate

[57] ABSTRACT

A system for presenting documents to a slit-scan exposure station includes a first fluidic storage station in which a rack for storing documents is located. The rack includes a plurality of pockets in each of which a document may be stored, the rack being movable in a vertical direction. Fluid is used to move a document in a pocket partially out of the storage apparatus through an opening and into registration with a gate and a wall of the pocket. Thereafter, the gate is opened and a drive associated with the exposure station moves the partially ejected document past a scan window. The rack is then vertically stepped to align another pocket with the opening and the procedure is repeated. Exposed documents are moved to a second fluidic storage station, similar to the first. At this station fluid drawn through an opening moves a document into a pocket of a rack and vertical movement of the rack is used to provide a separate pocket for each of the documents. Reversal of the fluid streams in the storage stations and the drive may be used in cooperation with a gate at the opening of the second station to again move the documents past the exposure station.

8 Claims, 5 Drawing Figures

DOCUMENT HANDLING APPARATUS

The subject invention relates to apparatus for feeding documents to an exposure station, such as is used in copying equipment, and for storing exposed documents. In addition, the invention relates to fluidic transports, such as disclosed in co-pending U.S. patent application Ser. No. 627,571 Pneumatic Registration Apparatus, filed on Oct. 31, 1975, on an invention by Klaus K. Stange, and co-pending U.S. patent application Ser. No. 627,570 A Registration Station, filed on Oct. 31, 1976, on an invention by Klaus K. Stange, et al, the applications having been assigned to the assignee herein, Xerox Corporation.

The public is aware of apparatus for storing and feeding documents wherein documents are stored in a bin and drive rollers engaging the top or bottom of the stack serially discharge the documents from the bin. Documents thus handled may be transported to an exposure station, such as is used in xerographic machines, and thereafter are usally moved into a collecting tray. In such apparatus frictional forces cause the documents to rub against each other and when the documents are repeatedly subjected to such treatment images on the documents and the documents themselves deteriorate.

It is an object of the present invention to provide document handling apparatus for storing documents in superposed fashion and for serially delivering the documents, fluidically, to an exposure station.

It is another object of the present invention to provide document handling apparatus for fluidically feeding documents to an exposure station and for fluidically moving documents received from an exposure station into storage apparatus.

Briefly, the invention disclosed herein provides document handling apparatus. Structurally, the apparatus includes (a) an exposure station; (b) a rack having a plurality of superposed pockets for storing documents; (c) means for aligning each of the pockets with the exposure station; and (d) fluidic means for moving documents in aligned pockets to the exposure station; and (c) means for receiving documents from the exposure station.

Additional objects and features of the invention will become apparent by reference to the following description in conjunction with the accompanying drawings, in which.

Figure 1:
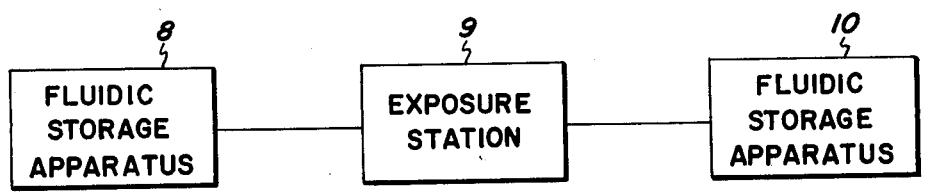
FIG. 1 is a block diagram of document handling apparatus, according to the invention.

An embodiment of document handling apparatus, according to the invention, is shown in block diagram from in FIG. 1. The apparatus includes fluidic storage apparatus 8 which is used to store documents and to serially feed documents to a xerographic exposure station 9. After exposure, station 9 feeds the documents to another fluidic storage station 10, which is similar to station 8. If desired, the functions of stations 8 and 10 may be reversed to re-expose documents.

Figure 4:
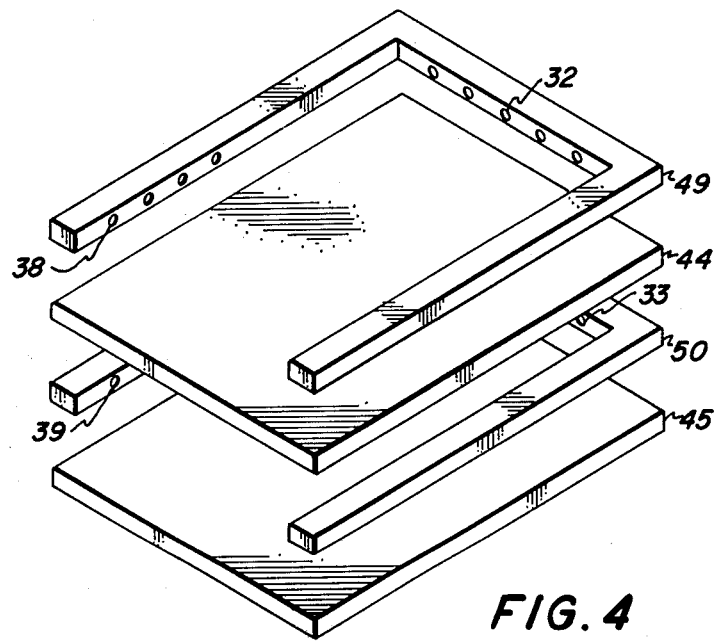
FIG. 4 is a partial exploded view of a storage rack of the apparatus.
Figure 2:
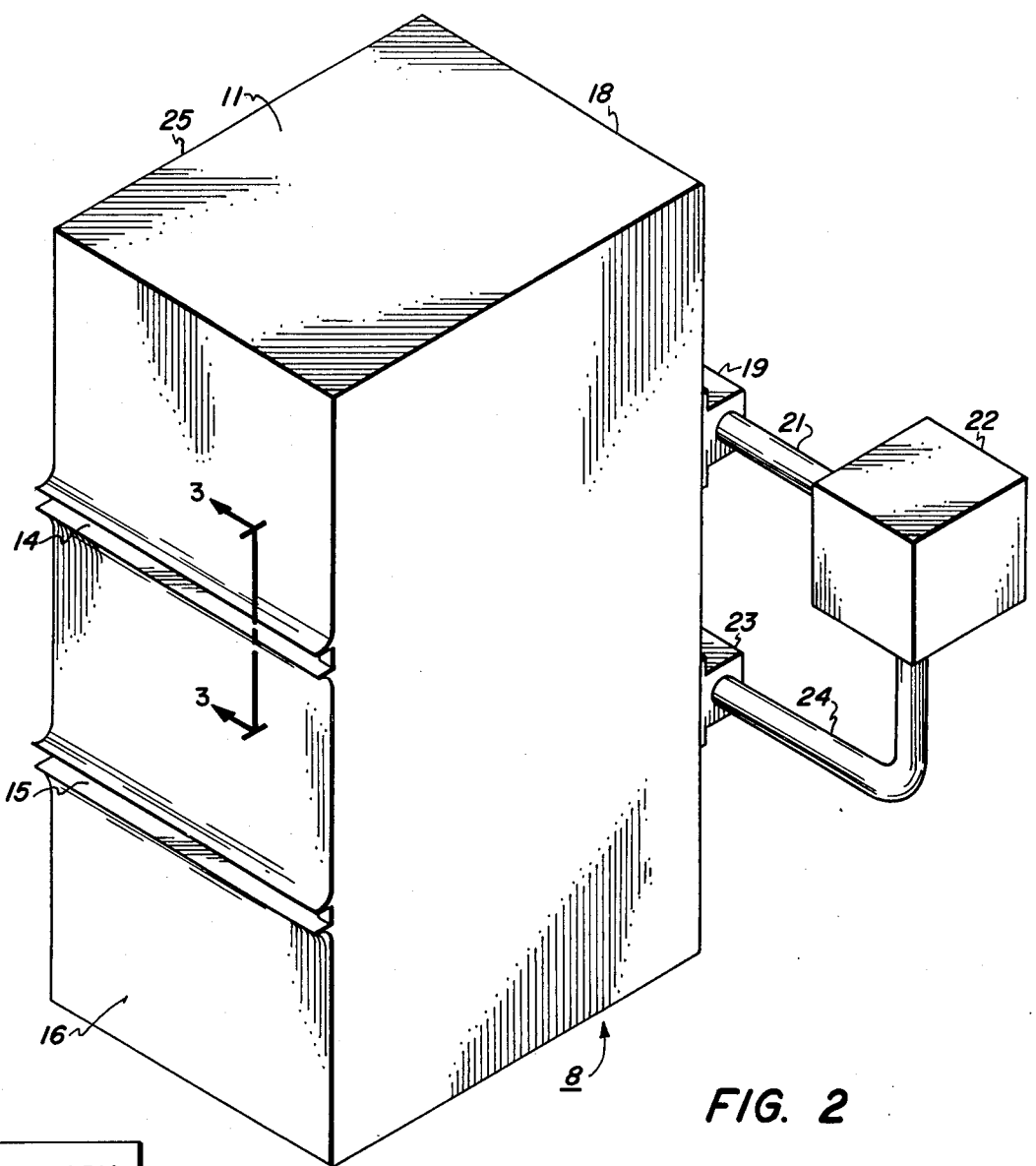
FIG. 2 is a perspective view of apparatus for storing documents, according to the invention.
Figure 3:
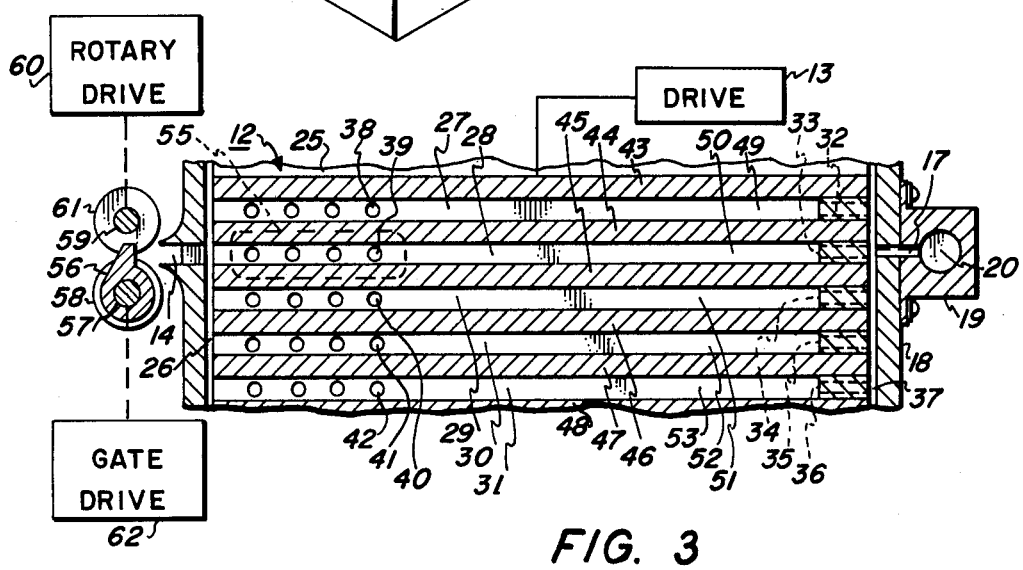
FIG. 3 is a partial cross-sectional view of the storage apparatus, the view having been taken along lines 3—3 in FIG. 2.

Referring to FIGS. 2 and 3, apparatus for storing documents 8, according to the invention, includes a generally rectangular housing 11 within which there is mounted a rack 12 and means for moving the rack up and down 13. Housing 11 includes a pair of spaced horizontal openings 14 and 15 on the wall 16 and a pair of horizontally disposed elongated holes 17 (only one shown) on the wall 18. Opening 14 and hole 17 are located at one horizontal level and opening 15 and the other hole are located at a lower horizontal level. Wall 18 supports a manifold 19 having a chamber 20 communicating with hole 17 and manifold 19 is coupled by a conduit 21 to a fluid source 22, more fully discussed below. Similarly, wall 18 supports a manifold 23 having a chamber communicating with the other hole (not shown), manifold 23 being coupled by a conduit 24 to the fluid source. Rack 12 is a rectangular structure having a plurality of superposed pockets 27–31 (not all shown) horizontally extending from a front side of the structure 26. In addition, the rack includes a plurality of sets of holes 32–36 (not all shown), each set extending through the back wall 37 of the structure and communicating with a different one of the pockets; and a plurality of groups of holes 38–42, each group extending through a side wall of the structure and communicating with a different one of the pockets. As shown in FIGS. 3 and 4, the rack may be manufactured from rectangular plates 43–48 (not all shown); U-shaped spacers 49–53 (not all shown) interposed between plates, each of the spacers including one of said sets of holes and one of the group of holes; and means for securing the spacers and plates together. Typically, the spacers and plates are fixed to each other with an adhesive; but, bolts (not shown) extending vertically through the plates and spacers and nuts cooperating therewith may be used.

Opening 15 is located such that when the rack 12 is in its lowermost position the top pocket of the rack is aligned therewith and its corresponding set of holes is aligned with the lower hole in the back wall 18. Therefore, if a vacuum pressure is applied to manifold 23 fluid is drawn through the opening, through the pocket, and through a set of holes. As a result, if a document is presented to the opening 15 it is moved into the pocket. If the rack 12 is moved upwardly in increments corresponding to the distance between adjacent pockets, the rack may be filled with documents. Opening 14 is located such that when rack 12 is in its uppermost position the bottom pocket of the rack is aligned therewith. In addition, the group of holes associated with the bottom pocket is aligned with a vent 55 in wall 25 and the corresponding set of holes associated with the bottom pocket is aligned with hole 17. Therefore, if fluid pressure is applied to manifold 19 fluid is injected through a set of holes into the bottom pocket and exists through a group of holes and opening 14. As discussed more fully hereinafter, a gate 56 is positioned adjacent opening 14, the gate being perpendicularly located with respect to the inner walls of the spacers. Accordingly, as the fluid exits a document in the bottom pocket is registered against the gate and the wall of the pocket having the group of holes.

Figure 5:
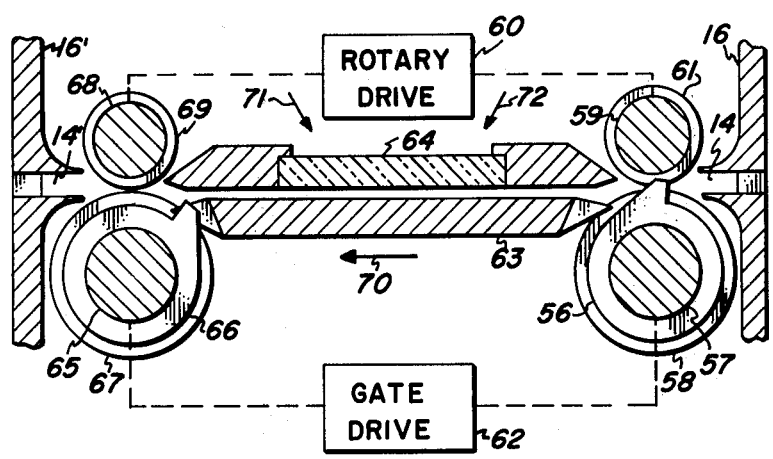
FIG. 5 is a cross-sectional view of an exposure station of the document handling apparatus.

Referring to FIGS. 3 and 5, exposure station 9 includes a rod 57 to which a gate 56 is rigidly secured and to which a pair of driven rollers 58 (only one shown) is rotatably mounted in flanking relationship with the gate. Above rod 57 there is located a rod 59 which is coupled to a rotary drive 60 and to which is fixed a pair of drive rollers 61 (only one shown), each of the drive rollers being located to provide a nip with one of the driven rollers. A gate drive 62 closes the gate 56 to provide a registration wall and opens the gate to allow the rollers to move a registered document at a predetermined speed between a backing plate 63 and a translucent plate 64. The exposure station also includes a rod 65 to which a gate 66 is rigidly secured and to which a pair of driven rollers 67 (only one shown) is rotatably mounted in flanking relationship with the gate. Above rod 65 there is located a rod 68 which is coupled to rotary drive 60 and to which is fixed a pair of drive rollers 69 (only one shown), each of the drive rollers being located to provide a nip with one of the driven rollers. With gate 66 open a document moved in the direction of arrow 70 is engaged by the rollers on rods 65 and 68 and the document is moved into apparatus for storing documents 10 (see FIG. 1), this apparatus being identical to storage apparatus 8 and parts thereof being designated with the numbers used to describe apparatus 8 and a prime notation. Although not shown, the manifold on apparatus 10 corresponding to manifold 19 may be supplied with vacuum to draw a document into a pocket of apparatus 10. It will be appreciated that with gate 66 closed and gate 56 open fluid provided to said corresponding manifold may be used to register a document with gate 66. With a reversal of the direction of rotation of drive 60 and with vacuum pressure applied to manifold 19 when gate 66 is opened the document can be delivered to a pocket in rack 12. Thus, if the rack of apparatus 8 is loaded with documents and the rack of apparatus 10 is empty, the racks may be moved to serially transfer documents past the exposure station in one direction 70 and then in the other direction. Alternatively, with the racks stationary, a document may be shuttled back and forth past the exposure station.

From the foregoing, it will be appreciated that drives for the racks in apparatus 8 and 10 must be capable of aligning respective pockets with one of the openings 14 and 14' and as is well known to those skilled in the elevator art, this may be accomplished with motors, pulleys, and sensors or with rack and pinon drives, etc.

Light directed as indicated by arrows 71 and 72 may be used to illuminate documents through the translucent plate 64 and slit-scan optics such as are used in the art of xerography may be used to project images or information on the documents to photosensitive or photoconductive materials from which copies of the documents may be provided. However, it should be noted that the exposure station described may be replaced, for example, with full frame exposure apparatus without deviating from the spirit of the invention. Further, if the document is, for example, a sheet of light sensitive material a light beam may be used to write on the sheet. Consequently, it should be appreciated that documents may be read or created at the exposure station.

Therefore, it is to be understood that the description herein of a preferred embodiment, according to the invention, has been set forth as an example thereof and is not to be construed or interpreted to provide limitations on the claims which follow and define the invention.

What is claimed is:
1. Document handling apparatus, comprising:
   a. an exposure station having a gate;
   b. a rack having a plurality of parallel pockets for storing documents;
   c. means for moving the rack to sequentially align each of the pockets with the exposure station;
   d. fluidic means for moving documents in aligned pockets into orthogonal registration with an aligned pocket and said gate;
   e. means for moving a registered document into the exposure station; and
   f. means for receiving documents from the exposure station.

2. Apparatus as defined in claim 1 wherein said rack is located in a housing having an opening and includes: a number of plates; a plurality of spacers; means for fixing the spacers to the plates, each of said spacers being located snugly between a different pair of plates, whereby the pockets are provided; and a plurality of holes extending through the spacers to communicate with the pockets, each spacer having at least one hole.

3. Apparatus as defined in claim 2 wherein said at least one hole is a set of holes and wherein said fluidic means includes means for injecting fluid to any one of the sets of holes when the pocket with which the set communicates is aligned with the opening.

4. Apparatus as defined in claim 3 wherein said means for injecting fluid includes a hole in the housing, a pump, and means for directing fluid from the pump through the hole, the hole being located so as to communicate with said any one of the sets of holes when the pocket with which the set communicates is aligned with the opening.

5. Apparatus as defined in claim 4 wherein each of the spacers includes a group of holes and the exposure station includes a gate.

6. Apparatus as defined claim 1 wherein said means for receiving documents from the exposure station includes: another rack having a plurality of superposed pockets for storing documents; means for aligning each of the pockets of said another rack with the exposure station; and second fluidic means for moving documents from the exposure station into aligned pockets.

7. Apparatus as defined in claim 6 wherein said fluidic means includes means for moving documents from the exposure station into pockets of said rack and said second fluidic means includes means for moving documents in said another rack to the exposure station.

8. Apparatus as defined in claim 7 wherein said rack is located in a housing having an opening and includes: a number of plates; a plurality of spacers; means for fixing the spacers to the plates, each of said spacers being located snugly between a different pair of plates, whereby the pockets are provided; and a plurality of sets of holes, each set of holes extending through a different one of the spacers and communicating with a pocket.

* * * * *